(12) United States Patent
Yon

(10) Patent No.: US 7,793,381 B2
(45) Date of Patent: Sep. 14, 2010

(54) BLADE-MOUNTABLE WINDSHIELD WIPER SPRAY DEVICE

(75) Inventor: Fulvio Yon, Donnas (IT)

(73) Assignee: ITW Automotive Italia S.R.L. con unico socio, Turin (IT)

( * ) Notice: Subject to any disclaimer, the term of this patent is extended or adjusted under 35 U.S.C. 154(b) by 800 days.

(21) Appl. No.: 11/696,060

(22) Filed: Apr. 3, 2007

(65) Prior Publication Data

US 2007/0226938 A1  Oct. 4, 2007

(30) Foreign Application Priority Data

Apr. 4, 2006  (IT) .......................... TO2006A0248

(51) Int. Cl.
*B60S 1/46* (2006.01)
*B60S 1/52* (2006.01)
(52) U.S. Cl. .................................. 15/250.04; 239/284.1
(58) Field of Classification Search ............. 15/250.04, 15/250.361, 250.01; 239/284.1
See application file for complete search history.

(56) References Cited

U.S. PATENT DOCUMENTS 3,827,101 A * 8/1974 Wubbe ..................... 15/250.04
4,516,288 A * 5/1985 Fizyta et al. ............. 15/250.04
5,722,107 A * 3/1998 Eustache et al. ......... 15/250.04

FOREIGN PATENT DOCUMENTS

| DE | 1902564 | * | 6/1970 |
|---|---|---|---|
| DE | 29923550 U1 | | 2/2001 |
| EP | 0566470 | * | 10/1993 |
| EP | 1097849 A1 | | 5/2001 |
| FR | 2729907 | * | 8/1996 |
| FR | 2754508 | * | 4/1998 |
| FR | 2851535 A1 | | 8/2004 |

OTHER PUBLICATIONS

EP Search Report for EP07105582.6 dated Mar. 5, 2009.

* cited by examiner

*Primary Examiner*—Gary K Graham
(74) *Attorney, Agent, or Firm*—Lowe Hauptman Ham & Berner LLP

(57) ABSTRACT

A blade-mountable windshield wiper spray device including a body formed by a first upper member, arranged in use distant from the blade and a second lower member, arranged in use in contact with the support part of the blade; the first member integrally in one piece carries a plurality of fluid-dynamic sprayers and snapping fastening means to the blade so that the second member is sandwiched in use between the first member and the blade, closing respective internal cup-shaped cavities open towards the second member of the first member; the first and the second members reciprocally and fluid-tightly couple so that the second member defines along with the internal cavities of the first member respective feeding chambers of the sprayers.

10 Claims, 2 Drawing Sheets

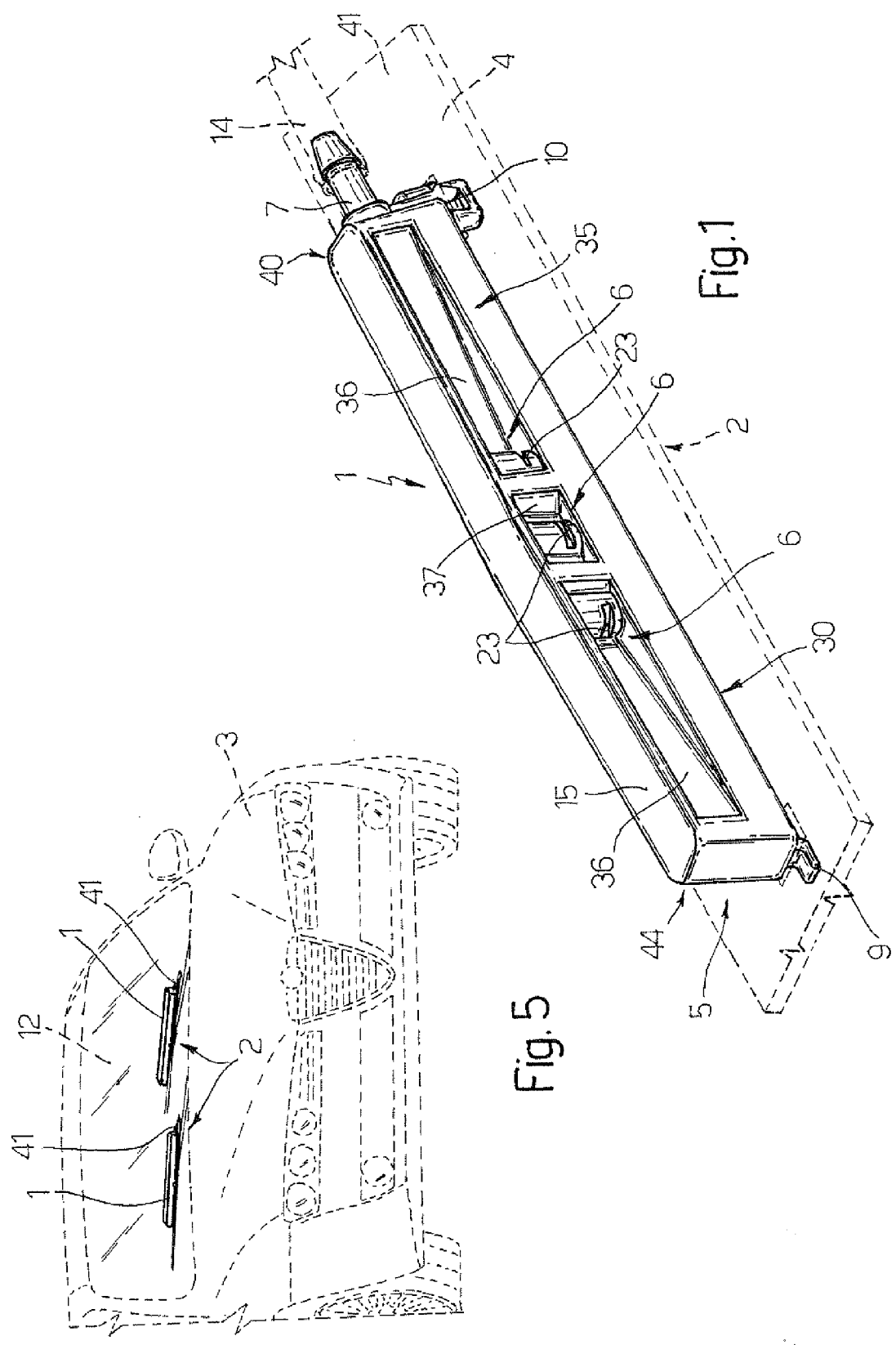

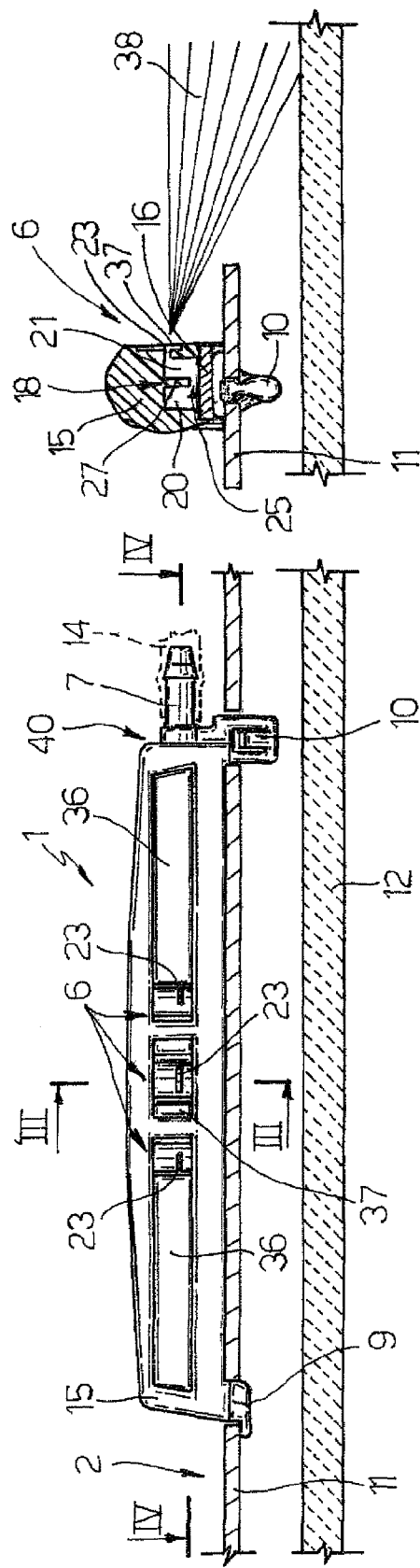
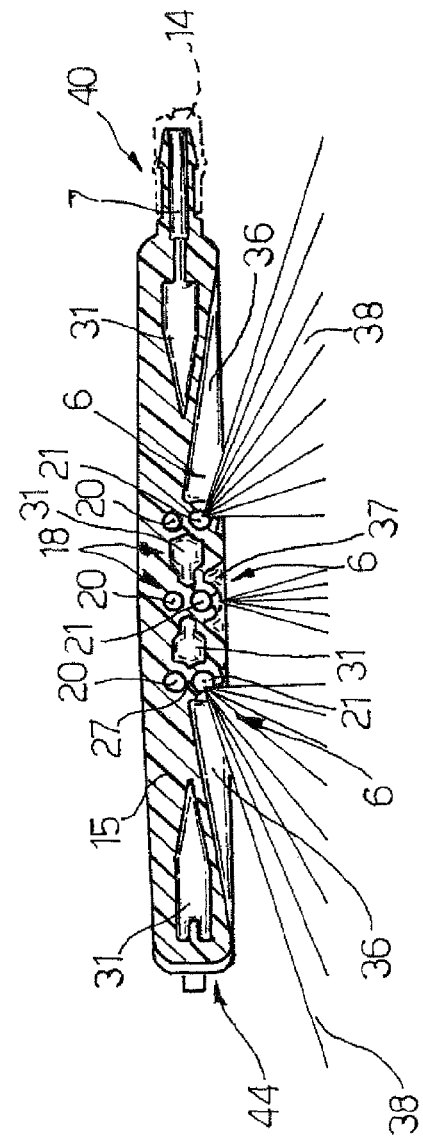

BLADE-MOUNTABLE WINDSHIELD WIPER SPRAY DEVICE

RELATED APPLICATIONS

The present application is based on, and claims priority from, Italian Application Number TO2006A 000248, filed Apr. 4, 2006, the disclosure of which is hereby incorporated by reference herein in its entirety.

The present invention relates to a spray device of a detergent fluid for a windshield of a vehicle, which spray device is blade-mountable and is at the same time capable of producing an optimal distribution of the detergent washing fluid of a vehicle window, typically the windshield.

BACKGROUND OF THE INVENTION

It is known that detergent washing fluid spray devices, associated to the windshield wiper device, which normally serves the windows for the purpose of removing rainwater, are used in vehicles for the purpose of wiping dirt and contaminants which are deposited on such windows of the passenger compartment, specifically on the windshield and the rear window.

A windshield wiper device usually comprises at least one oscillating arm, provided with reciprocating movement and associated to a controlling motor, and a windshield wiper blade carried by the arm and consisting of a carrying or supporting part, secured in articulated manner to the arm, and of a wiping part or blade, formed by rubber. The known spray devices usually consist of bodies made of one or more members provided with at least one atomising nozzle, which are fixed directly onto the vehicle body, either onto the bonnet or onto the base of the window to be wiped; consequently, since the motor of the pump which feeds the detergent washing fluid to the spray device is not synchronised with the motor which moves the arm, essentially for reasons of cost, a considerable part of the detergent fluid is wasted, because it is intercepted by the arm and/or by the blade and thus never reaches the window to be wiped, at least not in optimal washing conditions.

Furthermore, due to the machining tolerances, the known spray devices mountable in fixed position on the vehicle body often atomise part of the detergent fluid out of the window to be wiped, unless they are provided with adjustable nozzles, which are however more costly, are complex to manufacture and are of larger size.

In order to overcome these drawbacks, it has been attempted to obtain the sprayers integral with the carrying or supporting part of the windshield wiper blade; however, the final result has been until now unsatisfactory, leading to devices which are large in size, relatively costly and/or complex to manufacture and/or to mount and which are not capable of ensuring an atomisation of the washing jet.

SUMMARY OF THE INVENTION

It is therefore an object of the present invention to provide a windshield wiper spray device which is free from the described drawbacks and which is specifically blade-mountable while ensuring high manufacturing and assembly simplicity, small size and low costs and a high atomising capacity of the washing fluid jet which may be generated by the device itself.

The present invention thus relates to a windshield wiper spray device mountable on board of a blade of the windshield wiper itself as indicated in the attached Claims.

Specifically, the windshield wiper device comprises an internal hollow body carrying a plurality of nozzles of the fluid-dynamic type integrally in one piece thereof, a feeding nipple of a washing fluid to the sprayers and snapping fastening means of the body to a support part of the blade, wherein the body is formed by a first upper member, arranged in use distant from the blade and a second lower member, arranged in use in contact with the support part of the blade; the first member carries the sprayers and the snapping fastening means on the support part of the blade in such a manner that the second member is sandwiched in use between the first member and the blade, closing respective internal cup-shaped cavities open towards the second member of the first member; the first and the second members reciprocally and fluid-tightly couple so that the second member defines along with the internal cavities of the first member respective feeding chambers of the sprayers.

In this manner, the construction and assembly of the spray device are extremely simple and low-cost, but sufficient space to manufacture the sprayer nozzles according to fluid-dynamic technology is ensured along with a small size.

According to an aspect of the invention, moreover, the fluid-dynamic sprayers each comprise a first and a second feeding chambers, the first chamber being in hydraulic communication with the feeding nipple of the washing fluid and the second chamber being provided with a nozzle defined by a calibrated slot made through the first member of the body and arranged essentially parallel to the blade plane.

The first and the second chambers hydraulically communicate with each other through a passage delimitated between the second member of the body and an overhanging partition of the first member of the body, reciprocally separating the first and the second chamber; such passage and the nozzle are further arranged at opposite ends of the second chamber.

The second member of the body is shaped as a closing cap of the first member of the body, which is shaped as a self-bearing essentially prismatic monolithic member having its larger dimension oriented in use in direction of the length of the blade and delimiting within and at its lower face, facing in use towards the blade, the mentioned cup-shaped cavities and respective hydraulic connection passages between the cavities and the feeding nipple.

The chambers present essentially cylindrical symmetry and are arranged with the axis oriented perpendicularly to the lower face of the first member of the body.

In this manner, the maximum washing efficiency and an always optimal atomisation of the washing jet produced by the nozzles is obtained, all within an extremely reduced space.

BRIEF DESCRIPTION OF THE DRAWINGS

Further features and advantages of the present invention will be apparent in the following description of a non-limitative embodiment thereof, with reference to the accompanying drawings, in which:

FIG. 1 is a perspective three-quarters front view of a spray device for a windshield mountable on the windshield wiper itself, made according to the present invention;

FIG. 2 shows an elevation front view of the windshield device in FIG. 1, mounted in the operative working position;

FIGS. 3 and 4 show respective views taken along planes having tracks III-III and IV-IV respectively of the windshield spray device in FIG. 2; and FIG. 5 shows an example of application of the invention on vehicle.

DETAILED DESCRIPTION OF THE INVENTION

With reference to figures from 1 to 5, numeral 1 indicates as a whole a detergent washing fluid spray device for a windshield wiper device 2 of a known type (hereinafter simply indicated as "windshield wiper 2") of a road vehicle 3, e.g. a motor car; device 1 is mountable on a blade 4 of windshield wiper 2 itself and comprises an internally hollow body 5 carrying integral in one piece thereof a plurality of sprayers 6, in the case in point and as will be explained below, in better detail, of the fluid-dynamic type, a washing fluid feeding nipple 7 to sprayers 6 and fastening means 9,10 of body 5 to a support part 11 of blade 4.

Windshield wiper 2 serves a window 12 of vehicle 3, the windshield in the case in point, and the washing fluid, of any known type, kept in a reservoir (not shown) of vehicle 3 is fed in known manner to nipple 7 by a specific pump (not shown), upon the user's command, by means of a flexible tube 14 which is coupled in use to nipple 7.

According to a first aspect of the invention, body 5 is formed by a first upper member 15, arranged in use distant from blade 4 and by a second lower member 16 (FIG. 3), arranged in use in contact with support part 11 of blade 4 or in the immediate proximity of the same; first member 15 is further shaped so as to integrally carry both sprayers 6 and fastening means 9,10, the latter preferably, as described below, of the snapping type, so that second member 16 is sandwiched in use (FIG. 3) between first member 15 and blade 4, closing respective internal cavities 18 of first member 15, which are cup-shaped and open towards second member 16.

Furthermore, first member 15 and second member 16 reciprocally and fluid-tightly couple so that second member 16 defines respective feeding chambers 20,21 of sprayers 6 along with internal cavities 18 of first member 15.

A non-secondary aspect of the invention consist in the fact that the fluid-dynamic sprayers 6 each comprise a first feeding chamber 20 and a second feeding chamber 21, as defined above, which are respectively in hydraulic communication with nipple 7 (chamber 20) and with a nozzle of respective sprayer 6 (with which each chamber 21 is provided) defined by a calibrated slot 23 made through first member 15 and arranged essentially parallel to the blade plane, which is parallel to the laying plane of window 12.

Chambers 20 and 21 of each sprayer 6 hydraulically communicate with each other through a passage 25 (FIG. 3) defined by the clearance delimited between a lower edge of a partition 27 between chambers 20 and 21 and second member 16 of body 5. Specifically, passage 25 and nozzle defined by slot 23 of each chamber 21 are arranged at corresponding ends of the same and partition 27 is integrally made with the first member 15 of body 5 and is overhangingly protruding towards the second member 16 of body 5, which member 16 is shaped as a preferably snapping closing cap of first member 15.

Member 15 is shaped as a self-bearing essentially prismatic monolithic member having its larger dimension oriented in use in direction of the length of blade 4 and delimiting within and at its lower face 30 (FIG. 1), facing in use towards blade 4, the cup-shaped cavities 18 and respective hydraulic connection passages 31 between cavities 18 (cavities 18 defining chambers 20 in the case in point) and washing fluid feeding nipple 7.

According to an aspect of the invention, chambers 20,21 present an essentially cylindrical symmetry and are arranged with their axis perpendicularly oriented to lower face 30 of first member 15 of body 4; passage 25 between chambers 20,21 of each sprayer 6 is thus arranged at a lower end of second chamber 21, immediately next to second member 16 of body 5, while the nozzle defined by corresponding slot 23 is flushed with a blind upper end of chamber 21 itself, arranged distant from second member 16 of body 5.

Furthermore, slots 23 of all sprayers 6 are, according to the non-limitative example shown, all obtained aligned on a same plane, i.e. lay in axis along a straight line parallel to the blade plane; obviously, according to a variant not shown for the sake of simplicity, slots 23 could also not be aligned.

Finally, first member 15 is provided, on an external side surface 35 thereof (FIG. 1) and at slots 23, with respective recesses 36,37 shaped so as to aerodynamically shield in use respective jets 38 of washing fluid produced in use by sprayers 6 specifically in the direction of travel of vehicle 3.

Nipple 7 is provided overhangingly protruding externally on first member 15 of body 5, at its longitudinal end 40 intended in use to be arranged near a base end 41 of blade 4, which is close to the arm which supports the same in a known manner.

Snapping fastening means 9,10 of body 5 to support part 11 of blade 4 preferably comprise an essentially rigid L-shaped tooth 9 and an elastically deformable U-shaped tooth 10, integrally made in one piece with and overhanging from first member 15 of body 5, at opposite longitudinal ends of the same, i.e. at the afore-mentioned end 40 provided in axis with nipple 7, and at an opposite end 44.

The invention claimed is:

1. A blade-mountable windshield wiper spray device, comprising:
   an internal hollow body having a plurality of nozzles integrally disposed in one piece thereof,
   a feeding nipple configured to communicate a fluid to the plurality of nozzles; and
   fastening means for fastening the body to a support part of the blade;
   wherein said body includes:
   a first upper member disposed distant from the blade; and
   a second lower member configured to be in contact with the support part of the blade;
   wherein the first upper member supports said nozzles and said fastening means and the second lower member is configured to be sandwiched between the first upper member and the blade, closing respective cup-shaped cavities defined in the first upper member and open towards the second member; and
   wherein the first upper and the second lower members are configured to reciprocally and fluid-tightly couple so that the second lower member defines, along with said cup-shaped cavities of the first upper member, respective feeding chambers of said nozzles.

2. A device according to claim 1, wherein said nozzles are fluid-dynamic nozzles.

3. A device according to claim 2, wherein said fluid-dynamic nozzles each comprise a first and a second said feeding chambers, the first chamber being in hydraulic communication with said feeding nipple and the second chamber being provided with a nozzle defined by a calibrated slot through the first member and disposed essentially parallel to the blade plane.

4. A device according to claim 3, wherein the first and the second chambers hydraulically communicate with each other through a first passage delimited by a lower edge of a dividing partition between the first and the second chambers and the second member of the body.

5. A device according to claim 4, wherein said passage, and nozzle defined by said slot are arranged at opposite ends of the second chamber; said partition integrally formed in one piece with the first upper member, said partition overhangs and protrudes towards the second lower member.

6. A device according to claim 5, wherein said second lower member of the body is shaped as a closing cap, and is a self-bearing, essentially prismatic monolithic member, configured to have its larger dimension oriented in a length direction of the blade and delimiting, at its lower face facing towards the blade, said cup-shaped cavities and respective hydraulic connection passages between said cup-shaped cavities and said feeding nipple.

7. A device according to claim 6, wherein said chambers present an essentially cylindrical symmetry and are arranged having axis perpendicularly oriented to said lower face of said first upper member; said passage between the first and the second chambers of each nozzle being arranged at a lower end of the second chamber, immediately next to said second member of the body, and said nozzle defined by said slot being flushed with a blind upper end of the second chamber, arranged distant from the second lower member.

8. A device according to claim 7, wherein said first upper member is disposed on an external side surface of the body and at said slots defining the nozzles of the sprayers, which are aligned on a same plane, of respective recesses aerodynamically shaped so as to shield jets of a washing fluid produced by said nozzles.

9. A device according to claim 1, wherein said nipple overhangs and protrudes externally on said first upper member, at its longitudinal end configured to be near a base end of the blade.

10. A device according to claim 1, wherein said fastening means fastening the body to a support part of the blade are snap-in mounting means.

* * * * *